United States Patent
Rascon

(10) Patent No.: US 12,209,763 B2
(45) Date of Patent: Jan. 28, 2025

(54) HYBRID LINE VOLT TWO-WIRE THERMOSTAT

(71) Applicant: Ademco Inc., Golden Valley, MN (US)

(72) Inventor: Raul Antonio Rascon, Chihuahua (MX)

(73) Assignee: Ademco, Inc., Golden Valley, MN (US)

( * ) Notice: Subject to any disclaimer, the term of this patent is extended or adjusted under 35 U.S.C. 154(b) by 230 days.

(21) Appl. No.: 18/064,637

(22) Filed: Dec. 12, 2022

(65) Prior Publication Data

US 2024/0195403 A1    Jun. 13, 2024

(51) Int. Cl.
*F24F 11/88* (2018.01)
*F24F 11/46* (2018.01)

(52) U.S. Cl.
CPC .............. *F24F 11/88* (2018.01); *F24F 11/46* (2018.01)

(58) Field of Classification Search
CPC .................................. F24F 11/46; F24F 11/88
See application file for complete search history.

(56) References Cited

U.S. PATENT DOCUMENTS

| | | |
|---|---|---|
| 4,677,282 A | 6/1987 | Walsh |
| 5,022,460 A * | 6/1991 | Brown ................. F24F 11/67 165/265 |
| 5,460,221 A | 10/1995 | Stalsberg et al. |
| 5,841,204 A | 11/1998 | English |
| 2005/0271372 A1 | 12/2005 | Knepler |

FOREIGN PATENT DOCUMENTS

KR    1999-000393    1/1999

OTHER PUBLICATIONS

International Search Report in PCT International Application No. PCT/US2023/083553 mailed Feb. 29, 2024.

* cited by examiner

*Primary Examiner* — Jonathan Bradford
(74) *Attorney, Agent, or Firm* — Greenberg Traurig, LLP; Ryan D. Sharp; David J. Dykeman

(57) ABSTRACT

Disclosed are systems and methods that provide a novel thermostat system, which involves a hybrid line volt two-way thermostat configured with triode for alternating current (TRIAC) and relay components. The configuration and operational benefits of each thermostat type can be leveraged by the disclosed hybrid thermostat, which can provide a silent, efficiently operated thermostat system. Such system provides a resource efficient heating, ventilation and cooling control system that can reduce power consumption and thereby reduce costs, while maintaining a streamlined, operationally accurate framework for monitoring and managing the climate of a location (e.g., building, home, office, and the like).

6 Claims, 4 Drawing Sheets

HYBRID LINE VOLT TWO-WIRE THERMOSTAT

FIELD OF THE DISCLOSURE

The present disclosure is generally related to a thermostat system, and more particularly, to a hybrid two-wire thermostat.

BACKGROUND

Line voltage (or line-voltage, used interchangeably) thermostats operate to control heating, ventilation and cooling systems (e.g., baseboards, floor/ceiling heating, and the like, for example) for a location (e.g., a building, room, home, office, and the like). Conventional line voltage thermostats are divided into two different, independently operated product types, which include triode for alternating current (TRIAC) thermostats and relay thermostats.

SUMMARY OF THE DISCLOSURE

Each product type, however, has their benefits and disadvantages. For example, conventional TRIAC (or bidirectional or bilateral triode thyristor) thermostats have short control periods (e.g., 5-20 seconds, for example), which enables a silent operation of the device. TRIAC thermostats further provide more comfort (when compared to relay thermostats). The added comfort of TRIAC devices can be realized through a reduced control band (e.g., the maximum and minimum temperature reach during operation), which can be enabled by an increase in the quantity of cycles per hour (which is directly tied to the short control periods of operation, discussed supra).

However, TRIAC thermostats require a large heat sink for high loads, which reduces the aesthetics of conventional thermostats with TRIAC components (e.g., they are large and bulky on the wall).

Conventional relay thermostats do not include heat sinks, therefore their footprint on the wall is minimized; however, they have long cycles (e.g., 15 minutes) that allow the heater to effectively push warm air into the room when, for example, using a fan-forced convector. This switching causes a sound when the relay is activated (e.g., emits/ produces a sound every time the thermostat goes into a heat call). Conventional relay thermostats exhibit an decrease in cycles per hour, which reduces the comfort, as in contrast to the above discussion with TRIAC devices.

Thus, operating each thermostat type independently does not produce the desired heating, ventilation and cooling (HVAC) control modern users and/or locations require. Accordingly, the disclosed systems and methods provide a novel thermostat system, which involves a hybrid line volt two-way thermostat configured with TRIAC and relay components. As discussed herein, the benefits of each thermostat type can be leveraged by the disclosed hybrid thermostat, while reducing the above mentioned drawbacks, inter alia, which can provide a silent, efficiently operated thermostat system. Such system, as evidenced from the instant disclosure, provides a resource efficient HVAC control system that can reduce power consumption and thereby reduce costs, while maintaining a streamlined, operationally accurate framework for monitoring and managing the climate of a location (e.g., building, home, room office, and the like).

According to some embodiments, the disclosed hybrid thermostat can be utilized for a zoned heating/cooling environment at a location. In some embodiments, the disclosed hybrid thermostat can be implemented for a centralized HVAC system or baseboard system. Thus, it should be understood that any type of known or to be known climate heating/cooling system utilized in a structure at a location (e.g., building) can utilize the disclosed hybrid thermostat, and reference to an HVAC system herein should not be construed as limiting, as it is used as an example embodiment.

According to some embodiments, a method is disclosed for operating a hybrid two-wire thermostat that includes TRIAC and relay-based thermostat functionality. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed cause at least one processor to perform a method for operating a hybrid two-wire thermostat that includes TRIAC and relay-based thermostat functionality.

In accordance with one or more embodiments, an apparatus (or system) for the hybrid two-wire thermostat is provided that includes one or more processors and/or device components configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
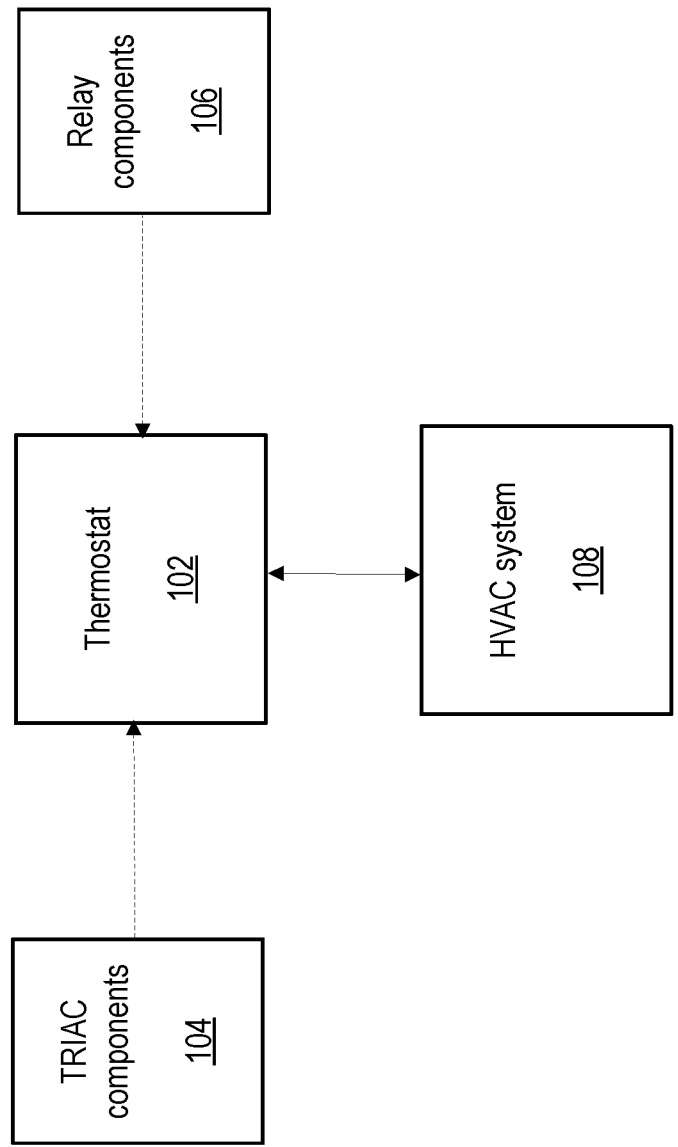
FIG. 1 is a block diagram of an example configuration of a hybrid thermostat according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

Certain embodiments and principles will be discussed in more detail with reference to the figures. According to some embodiments, as discussed herein, the disclosed hybrid thermostat can have a reduced heat sink size for high power thermostats. Accordingly, in some embodiments, the disclosed hybrid thermostat configuration would have all the benefits from TRIAC and relay thermostats, in that reduced wear on the relay can be realized, as well as improved comfort for the user(s) (at a location where the thermostat operates), which can be provided via the automated processing of the hybrid configuration discussed herein.

With reference to FIG. 1, depicted is a hybrid thermostat 102 (referred to as thermostat 102) operating a location 100 which is operating to control a HVAC system 108. According to some embodiments, location 100 can correspond to any type of definable, enclosed geographical area that is capable of having its climate controlled via a heating and cooling system, such as, HVAC system 108. For example, a location can be a home, office, building, arena, enclosed parking garage, airport, and the like, and/or any type of enclosed area for which heating, cooling and/or ventilation can be provided.

As depicted in FIG. 1, thermostat 102 can include TRIAC components 104 (also referred to as TRIAC, interchangeably) and relay components 106. As discussed in more detail below, in some embodiments, TRIAC components 104 can correspond to a n terminal (e.g., three, for example) electronic component that can conduct current in either direction when triggered. TRIACs can include a subset of thyristors, which as one of ordinary skill in art would understand, are solid-state semiconductor devices with k layers (e.g., four, for example) of alternating P- and N-type materials used for power applications. Accordingly, in some embodiments as discussed herein, TRIAC components 104 (e.g., thyristor(s)) can act as a bistable switch (or latch) that can conduct current when the gate receives a current trigger, and continue such conduction until voltage across the device is reversed biased (or until the voltage is removed, for example, at the conclusion of a duty cycle).

In some embodiments, relay components 106 (also referred to as "relay" or RELAY, interchangeably), can enable heating and cooling equipment (associated with HVAC system 108, for example) to be communicated with via relay switch (e.g., a force-guided contact, for example), whereby a relay coil can be energized or de-energized so as to toggle between modes of operation (e.g., heating versus cooling).

According to some embodiments, thermostat 102 can include, but is not limited to, a frame and housing, flange, spring, a wax element, and/or any other type of component associated with known or to be known thermostat devices. As discussed in more detail below, at least in relation to FIGS. 2-4, thermostat 102 is specifically configured with TRIAC components 104 and relay components 106 so as to provide a novel control of a climate at location 100, as discussed herein.

According to some embodiments, thermostat 102 can be controlled, programed, managed and/or connected to a peripherally connected device. For example, user equipment (UE) (not shown) can connect to thermostat 102. For example, UE can be any type of device, such as, but not limited to, a smartphone, tablet, wearable device (e.g., smart watch), laptop, personal computer, Internet of Things (IOT) device, and the like, or some combination thereof.

Accordingly, in some embodiments, UE can connect to thermostat 102 via a network, which as discussed below, can be any type of network, such as, but not limited to, a local network, wireless network, cellular network, the Internet, and the like (as discussed below). In some embodiments, UE can connect to thermostat 102 via any type of known or to be known pairing mechanism, including, but not limited to, Bluetooth™, Bluetooth Low Energy (BLE), Near Field Communication (NFC), and the like.

According to some embodiments, the disclosed functionality can be executed by thermostat 102, via microcontroller unit (MCU) 202 (discussed infra), executing a software application. In some embodiments, the application may be stored and executed by thermostat 102 (and/or in associated data storage accessible to the thermostat 102). In some embodiments, the application may be a web-based application that is executed by thermostat 102 or a connected device, for example, a UE, such as a user's mobile device, as discussed above. In some embodiments, the application may execute on the UE, whereby controls of the thermostat 102 are provided as computer-executable instructions via the paired connection. In some embodiments, the application may be configured and/or installed as an augmenting script, program or application (e.g., a plug-in or extension) to another application or program provided by a service provider and/or executing on thermostat 102 and/or a UE.

Figure 2:
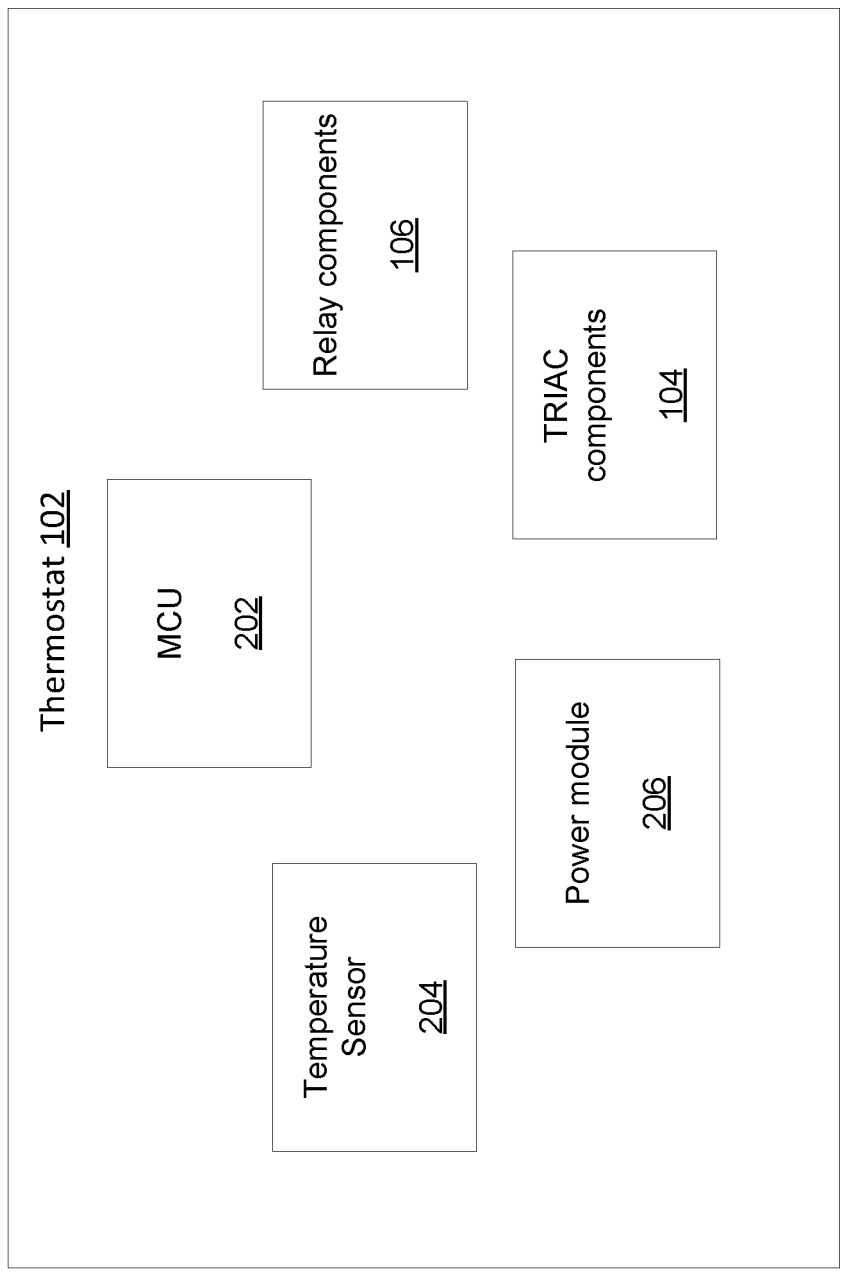
FIG. 2 is a block diagram illustrating components of an exemplary hybrid thermostat according to some embodiments of the present disclosure.

Turning to FIG. 2, depicted are non-limiting components of thermostat 102 according to some embodiments of the present disclosure. It should be understood that the components discussed herein are non-exhaustive, as additional or fewer components may be applicable and/or included in thermostat 102, as understood by those of ordinary skill in the art.

According to some embodiments, thermostat 102 can include MCU 202, temperature sensor 204, power module 206, TRIAC components 104 and relay components 106.

According to some embodiments, the hybrid thermostat 102 can be configured with internal TRIAC components 104 and relay components 106 (as discussed above), which can be controlled by MCU 202. According to some embodiments, as discussed herein, TRIAC components 104 can operate to reduce the power managed via power module 206 according to a low power situation (50%+ of the total operation time). According to some embodiments, this can be effectuated by a determined control duty cycle and load current managed by MCU 202.

In some embodiments, reduced power management via power module 206 can further, or in the alternative, be effectuated by a determined temperature, which can be an internal temperature of the thermostat 102, which can be monitored via temperature sensor 204.

According to some embodiments, if/when the internal temperature of thermostat 102 is determined to be too high (e.g., at or above a threshold temperature, for example, 125 degrees Celsius), the MCU 202 can switch operation from a "TRIAC mode" to a "relay mode". In some embodiments, MCU 202 can calculate a temperature of the TRIAC 104 using a temperature sensor (e.g., a thermistor). In some embodiments, data related to the sensor's calculations can be used on/via a proportional integral derivative (PID) control system to keep the temperature of the TRIAC 104 below its maximum (e.g., 125 degrees Celsius, for example) by using the relay 106 to continue with an extended duty cycle.

According to some embodiments, such determination and switch operation between modes can be performed automatically by MCU 202, without input and/or interaction by a user.

According to some embodiments, upon such mode switch being executed by MCU 202, TRIAC components 104 may still be in use and utilized to cause a soft start to/for the relay, which can reduce wear on the relay components 106 (e.g., relay contacts), thereby effectuating an increase in life of the components and overall operation of thermostat 102. According to some embodiments, for example, a soft start can be performed by turning the TRIAC 104 on for a specific time before and/or after changing state on the relay 106. In some embodiments, this can reduce wear on the contacts of the relay components 106.

According to some embodiments, the operation can continue on a mixed operation (e.g., TRIAC and relay modes running simultaneously, for example) to keep the comfort level high. In some embodiments, this can be performed by increasing the average cycles per hour during a mixed operation, thus reducing the average control band and reducing the noise from the relay. In some embodiments, the mixed operation run for a predetermined period of time, which can be determined by the PID controlling the room temperature, and/or the PID controlling the TRIAC components 104. In some embodiments, as discussed below, the mixed operation may run until an internal temperature measurement (e.g., via temperature sensor 204) is determined to be out of a preferred range of temperatures. In some embodiments, the mixed operation may run to the end of a duty cycle, such that upon initiating relay mode, TRIAC mode continues as well. In some embodiments, TRIAC components 104 can operate at a reasonable temperature (e.g., below the threshold temperature, as discussed above), which can reduce the noise from the relay.

According to some embodiments, the configuration and operation of thermostat 102 in such manner would enable a high power, small-sized thermostat with TRIAC performance, which currently does not exist in the market. Indeed, according to some embodiments, the disclosed operation enables the usage of TRIAC as much as possible, where relay components/modes may only be utilized when temperatures are above safe levels (e.g., above 125 degrees Celsius, for example) Indeed, according to some embodiments, the disclosed hybrid thermostat 102 may still require a heat sink; however, the reliance on the heat sink is diminished, thereby enabling the size of the heat sink to be substantially smaller than conventional TRIAC thermostats. As such, the hybrid thermostat 102 can be sized more in relation to traditional relay thermostats.

Figure 3:
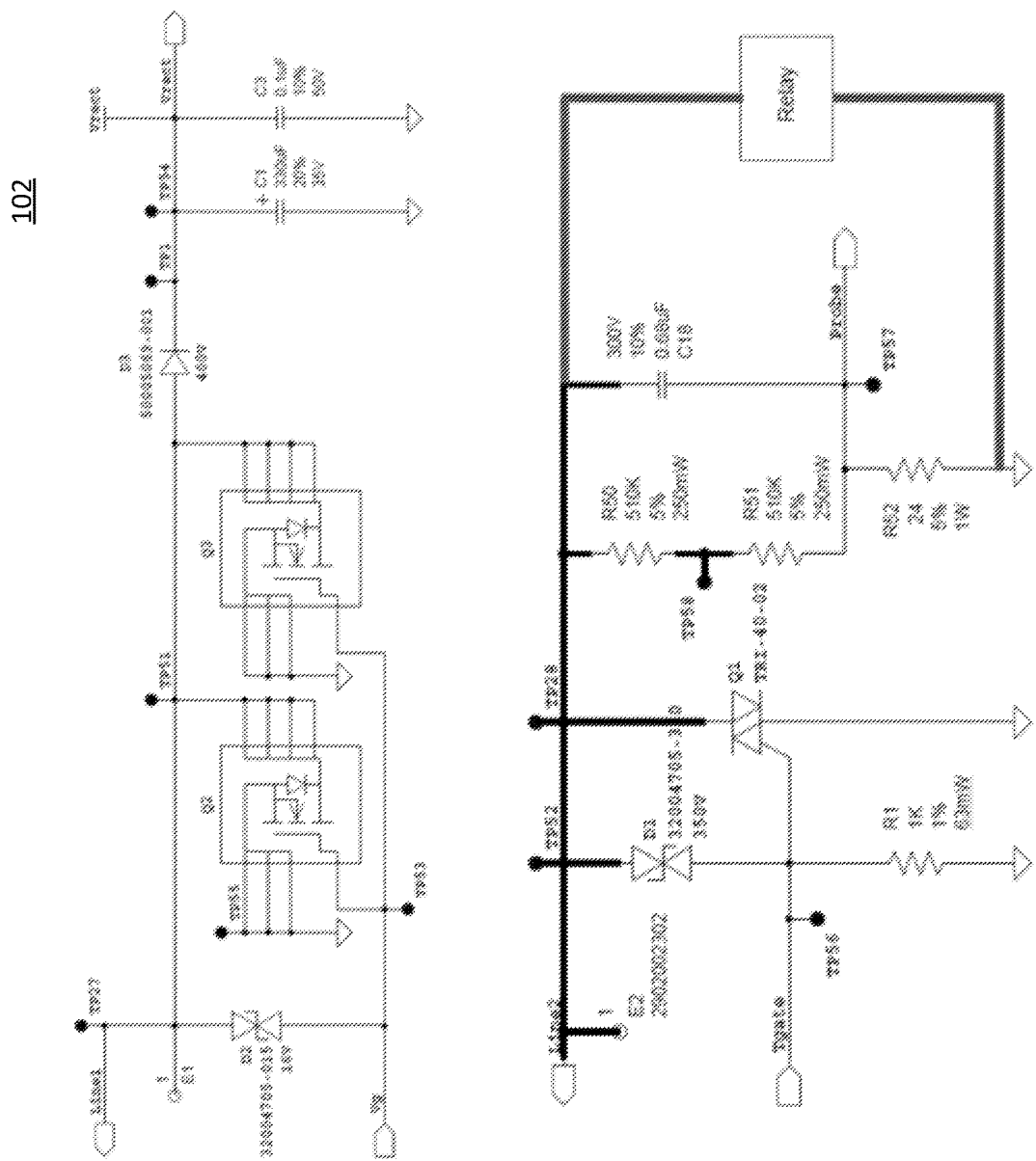
FIG. 3 illustrates an exemplary circuit diagram of a hybrid thermostat used in various embodiments of the present disclosure.

Turning to FIG. 3, Process 300 provides non-limiting example of circuitry of thermostat 102. The disclosed circuitry discussed herein operates according to the components of thermostat 102, as discussed above in relation to FIG. 1 and FIG. 2.

According to some embodiments, as depicted in FIG. 3, the circuitry of thermostat 102 includes a first power line connected to a load, and a thyristor (e.g., TRIAC component 104) on the first power line configured to selectively connect the circuit to the load via the first power line. The circuitry further includes a second power line connected to load in parallel with the first power line. In some embodiments, a relay (e.g., relay component 106) is positioned on the second power line, and is configured to selectively connect the circuit to the load via the second power line.

According to some embodiments, the circuitry further includes a controller (e.g., MCU 202), which is configured to receive a temperature measurement from the temperature sensor (e.g., temperature sensor 204). In some embodiments, the temperature measurement can be indicative of a temperature of the circuit in the thermostat 102.

According to some embodiments, the controller (e.g., MCU 202) is further configured to determine an operating mode of the circuit based on the temperature measurement and a predetermined temperature threshold. In some embodiments, the operating mode can include a thyristor control mode (e.g., TRIAC mode), whereby the controller can actuate the thyristor to selectively connect the circuit to the load when the temperature measurement is less than the predetermined temperature threshold. In some embodiments, the operating mode comprises a relay control mode (e.g., relay mode), whereby the controller can actuate the relay to selectively connect the circuit to the load when the temperature measurement is greater than the predetermined temperature threshold. According to some embodiments, for example TRIAC can be activated using active triggering; and, in some embodiments, for example, relay can be activated using a driver.

According to some embodiments, the controller can be further configured to receive a load set point, and based therefrom, determine a load connect rate representative of a frequency of powering the load via the circuit (e.g., via power module 206, for example). In some embodiments, the controller can then control, based on the operating mode, at least one of the thyristor or the relay at the load connect rate to power the load at the frequency.

Figure 4:
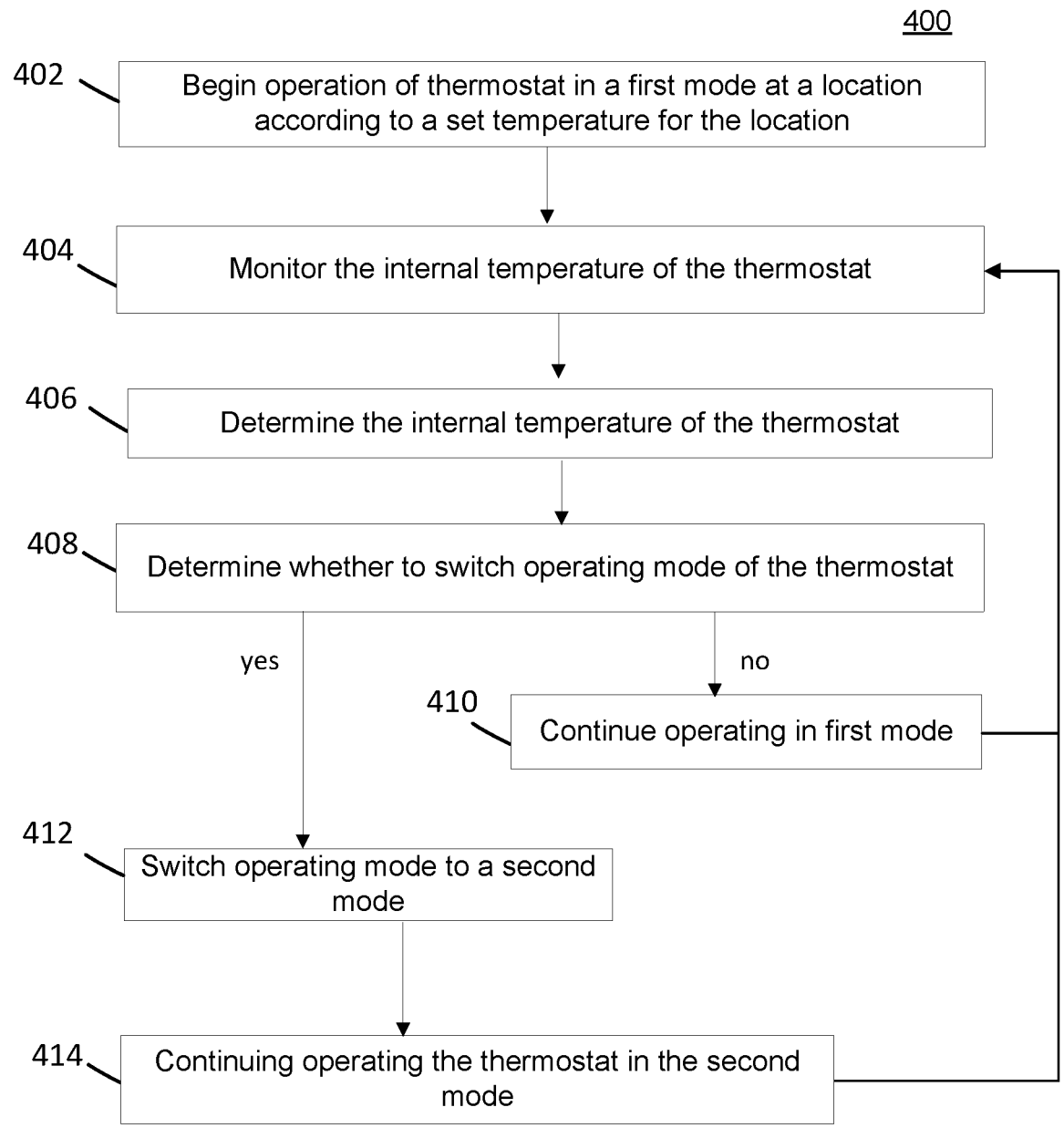
FIG. 4 illustrates an exemplary work flow according to some embodiments of the present disclosure.

Turning to FIG. 4, disclosed is Process 400 which provides non-limiting example embodiments for the operational capabilities functionality of the disclosed hybrid thermostat. Accordingly, in some embodiments, as discussed herein, the Process 400 can operate to control the temperature within thermostat 102, which can effectively control how much power is being consumed and/or utilized by thermostat 102 (and/or its TRIAC and relay components). Thus, among other benefits, the disclosed functionality enables the operation of the thermostat 102 within safe temperature and power consumption limits.

According to some embodiments, Process 400 begins with Step 402 where an operation of a thermostat in a first mode is commenced. The operation is a for a location (e.g., an enclosed space, such as, for example, a house/home). The operation corresponds to a set or programmed temperature for a location. For example, the thermostat may be set by a user to a particular temperature (e.g., 72 degrees Fahrenheit). In another non-limiting example, the thermostat may automatically operate to the set temperature according to a programmed setting (e.g., set to 72 degrees at 7 AM each weekday, for example).

According to some embodiments, the first mode can be TRIAC mode, as discussed above. For purposes of this disclosure, TRIAC mode will be discussed as being the first or initial operational mode of the thermostat for a particular duty cycle (and subsequently switching to a second mode, relay mode, as discussed below). In some alternative embodiments, a first mode may be relay mode, whereby switching to TRIAC mode would be readily understood by those of ordinary skill in the art.

It should be understood that while the discussion herein will be in reference to a thermostat operating for a location as a whole (e.g., a house), it should not be construed as limiting, as the disclosed thermostat's functionality can be applicable to sub-parts (or zones) within a home, whereby parallel operations can be executed to control each sub-part/zone in real-time and simultaneously.

In Step 404, the internal temperature is monitored for the operation of during the first mode. According to some embodiments, such monitoring can be performed continuously, or according to a predetermined time interval (e.g., every 10 seconds, for example, which can be in relation to a programmed control period for TRIAC operations). In some embodiments, such monitoring can be dependent upon the type of the mode being operated—for example, in TRIAC mode, the time interval may be continuous and/or every 10 seconds, for example, and in relay mode, the time interval for monitoring can be continuous and/or every 10 minutes, for example, which may also be in relation to a programmed control period for relay operations.

In Step 406, based on the monitoring, an internal temperature of the thermostat is determined. In Step 408, a determination can then performed in relation to determining whether the internal temperature is at or above a threshold temperature. This determination enables a determination as to whether to switch operating mode of the thermostat (e.g., switch from the first mode to a second mode). In some embodiments, two PIDs can be utilized, with one to control the temperature of the location (e.g., room), and a secondary PID to limit the temperature of the TRIAC, as discussed above. In some embodiments, the output of one or both PIDs can be used to control the toggling between TRIAC and relay modes, as discussed herein.

According to some embodiments, the determination to switch operating modes (e.g., Steps 406-412, and more particularly, Step 408) can be performed via MCU 202, for example, executing and/or implementing any type of known or to be known computational analysis technique, algorithm, mechanism or technology, which can include, but is not limited to, a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, MCU 202 may be configured to utilize one or more AI/ML techniques to perform the determination of Step 408, such as, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neutral network technique may be one of, without limitation, feedforward neural network, radial basis function network, recurrent neural network, convolutional network (e.g., U-net) or other suitable network. In some embodiments and, optionally, in combination with any embodiment described above or below, an implementation of neural network may be executed as follows:

a. define Neural Network architecture/model;
   b. transfer the input data to the neural network model;
   c. train the model incrementally;
   d. determine the accuracy for a specific number of timesteps;
   e. apply the trained model to process the newly-received input data; and
   f. optionally and in parallel, continue to train the trained model with a predetermined periodicity.

In some embodiments and, optionally, in combination with any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination with any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination with any embodiment described above or below, the aggregation function may be a mathematical function that combines (e.g., sum, product, and the like) input signals to the node. In some embodiments and, optionally, in combination with any embodiment described above or below, an output of the aggregation function may be used as input to the activation function. In some embodiments and, optionally, in combination with any embodiment described above or below, the bias may be a constant value or function that may be used by the aggregation function and/or the activation function to make the node more or less likely to be activated.

According to some embodiments, Process 400 proceeds from Step 408 to Step 410 when the internal temperature is determined to be below a threshold temperature. In Step 410, operation of the thermostat continues in the first mode, and Process 400 recursively proceeds back to Step 404 for continued monitoring, as discussed above.

According to some embodiments, Process 400 proceeds from Step 408 to Step 412 when the internal temperature is determined to be at or above the threshold temperature. In Step 412, operation of the thermostat switches from the first mode to the second mode. For example, as discussed above, MCU 202 causes the switching from TRIAC mode to relay mode, as discussed above. In some embodiments, the switch may involve a gradual switch between modes; and in some embodiments, the switch may involve each mode running simultaneously, at least for a predetermined period of time, as discussed above.

And, in Step 414, the thermostat continues operation in at least the second mode. In some embodiments, Process 400 proceeds from Step 414 recursively back to Step 404 for monitoring of the internal temperature for the remainder of the duty cycle, as discussed above.

In some embodiments, at the conclusion of a duty cycle (e.g., a programmed temperature setting, for example; or a newly defined temperature provided by a user, for example), processing can proceed back to Step 402 where operation in the first mode restarts (e.g., begin operation in TRIAC mode, for example). In some embodiments, this may only occur upon a determination that the internal temperature is below the temperature threshold. In some embodiments, even for a new duty cycle, if the temperature is at or above the temperature threshold, operation can commence, and/or restart in relay mode.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device (e.g., UE) may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. An apparatus comprising:
    a controller;
    a temperature sensor; and
    a circuit connected to a load;
        wherein the circuit comprises:
            a first power line connected to the load;
            a thyristor on the first power line configured to selectively connect the circuit to the load via the first power line;

a second power line connected to load in parallel with the first power line; and a relay on the second power line configured to selectively connect the circuit to the load via the second power line;

wherein the controller is configured to:

receive a temperature measurement from the temperature sensor, wherein the temperature measurement is indicative of a temperature of the circuit;

determine an operating mode of the circuit based on the temperature measurement and a predetermined temperature threshold;

wherein the operating mode comprises a thyristor control mode whereby the controller actuates the thyristor to selectively connect the circuit to the load when the temperature measurement is less than the predetermined temperature threshold;

wherein the operating mode comprises a relay control mode whereby the controller actuates the relay to selectively connect the circuit to the load when the temperature measurement is greater than the predetermined temperature threshold;

receive a load set point;

determine a load connect rate representative of a frequency of powering the load via the circuit; and control, based on the operating mode, at least one of the thyristor or the relay at the load connect rate to power the load at the frequency.

2. The apparatus of claim 1, wherein the thyristor is a triode for alternating current (TRIAC).

3. The apparatus of claim 1, further comprising a smart thermostat configured to establish the load set point for the load, wherein the load comprises at least one air conditioning appliance.

4. A method comprising:

identifying, by a thermostat device, a temperature to operate the thermostat device for a location, the location being an enclosed space;

setting the thermostat device to the temperature, and commencing operation of a duty cycle at a first mode;

wherein the first mode corresponds to triode for alternating current (TRIAC) mode;

monitoring, by the thermostat device, an internal temperature of the thermostat device during operation at the first mode;

determining, by the thermostat device, that the internal temperature is at or above a temperature threshold;

gradually switching, by the thermostat device, to a second mode, the gradual switch comprising continuously executing the first mode for at least a predetermined period of time while also executing the second mode; wherein the second mode corresponds to a relay mode; and operating the thermostat device at the second mode for a remainder of the duty cycle.

5. The method of claim 4, further comprising:

determining that internal temperature is below the temperature threshold;

continuing to operate the thermostat device at the first mode; and continuing the monitoring of the internal temperature.

6. A non-transitory computer-readable storage medium tangibly encoded with computer-executable instructions, that when executed by a processor associated with a thermostat device, perform a method comprising:

identifying a temperature to operate the thermostat device for a location, the location being an enclosed space;

setting the thermostat device to the temperature, and commencing operation of a duty cycle at a first mode;

wherein the first mode corresponds to triode for alternating current (TRIAC) mode;

monitoring an internal temperature of the thermostat device during operation at the first mode;

determining that the internal temperature is at or above a temperature threshold;

gradually switching to a second mode, the gradual switch comprising continuously executing the first mode for at least a predetermined period of time while also executing the second mode;

wherein the second mode corresponds to a relay mode; and operating the thermostat device at the second mode for a remainder of the duty cycle.

\* \* \* \* \*